US009614210B2

(12) United States Patent
DeKeuster et al.

(10) Patent No.: US 9,614,210 B2
(45) Date of Patent: Apr. 4, 2017

(54) BATTERY MODULE VENT SYSTEM AND METHOD

(71) Applicant: Johnson Controls Technology Company, Holland, MI (US)

(72) Inventors: Richard M. DeKeuster, Racine, WI (US); Robert J. Mack, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 177 days.

(21) Appl. No.: 14/501,777

(22) Filed: Sep. 30, 2014

(65) Prior Publication Data

US 2016/0093857 A1    Mar. 31, 2016

(51) Int. Cl.
    *H01M 2/12*      (2006.01)
    *H01M 2/10*      (2006.01)
    *H01M 10/0525*   (2010.01)
    *H01M 10/42*     (2006.01)

(52) U.S. Cl.
    CPC ....... *H01M 2/1252* (2013.01); *H01M 2/1077* (2013.01); *H01M 2/1211* (2013.01); *H01M 2/1241* (2013.01); *H01M 10/0525* (2013.01); *H01M 10/425* (2013.01); *H01M 2200/20* (2013.01); *H01M 2220/20* (2013.01)

(58) Field of Classification Search
    CPC ............. H01M 2/1252; H01M 2/1077; H01M 2/1211; H01M 10/0525; H01M 10/425; H01M 2220/20; H01M 2200/20
    USPC .................................................... 429/53–56
    See application file for complete search history.

(56) References Cited

U.S. PATENT DOCUMENTS

| 5,843,593 | A  | 12/1998 | Fritts et al. |
| 6,238,813 | B1 | 5/2001  | Maile et al. |
| 6,405,747 | B1 | 6/2002  | King et al. |
| 6,660,426 | B2 | 12/2003 | Hampe et al. |
| 6,783,886 | B1 | 8/2004  | Sakakibara et al. |

(Continued)

FOREIGN PATENT DOCUMENTS

| DE | 102012222111 A1 | 6/2014 |
| EP | 0942479 A1      | 9/1999 |

(Continued)

OTHER PUBLICATIONS

PCT/US2015/035826 International Search Report and Written Opinion dated Sep. 29, 2015.

*Primary Examiner* — Gregg Cantelmo
(74) *Attorney, Agent, or Firm* — Fletcher Yoder P.C.

(57) ABSTRACT

A battery module includes a housing having an interior defined by multiple sides, one side of which is a lid. The battery module also includes lithium ion electrochemical cells disposed in the housing, each cell having a vent through which gases may be vented. Moreover, the battery module includes a first chamber defined by interior aspects of the housing. Furthermore, the first chamber receives vented gases directed in a first direction from the electrochemical cells. In addition, the battery module includes a surface of the first chamber. The surface is configured to direct the vented gases in a second direction. The battery module also includes a second chamber defined partially by the lid. The second chamber receives the vented gases from the first chamber and directs the vented gases from the housing.

12 Claims, 8 Drawing Sheets

(56) References Cited

U.S. PATENT DOCUMENTS

| | | |
|---|---|---|
| 7,507,500 B2 | 3/2009 | Donnelly et al. |
| 7,654,487 B2 | 2/2010 | Ghoreishi et al. |
| 7,733,054 B2 | 6/2010 | Phillips et al. |
| 7,871,719 B2 | 1/2011 | Houchin-Miller et al. |
| 7,951,477 B2 | 5/2011 | Wood et al. |
| 8,147,997 B2 | 4/2012 | Shimamori |
| 8,376,396 B2 | 2/2013 | Miller et al. |
| 8,399,114 B2 | 3/2013 | Kishii et al. |
| 8,518,568 B2 | 8/2013 | Dougherty et al. |
| 8,632,898 B2 | 1/2014 | Dougherty et al. |
| 8,642,204 B2 | 2/2014 | Higashino et al. |
| 2005/0147874 A1 | 7/2005 | Andersen et al. |
| 2006/0093895 A1 | 5/2006 | Lim |
| 2010/0323228 A1 | 12/2010 | Okamoto et al. |
| 2011/0045325 A1 | 2/2011 | Anzai et al. |
| 2012/0070703 A1 | 3/2012 | Wahl et al. |
| 2012/0164490 A1* | 6/2012 | Itoi ................. H01M 2/105 429/7 |
| 2012/0225335 A1 | 9/2012 | Naito et al. |
| 2012/0282503 A1 | 11/2012 | Fujikawa et al. |
| 2012/0328918 A1 | 12/2012 | Kim |
| 2013/0040174 A1 | 2/2013 | Takasaki et al. |
| 2013/0095356 A1 | 4/2013 | Shimizu et al. |
| 2013/0130070 A1* | 5/2013 | Adachi ............. H01M 10/4207 429/53 |
| 2014/0023896 A1 | 1/2014 | Gendlin et al. |
| 2014/0113167 A1 | 4/2014 | Itoi et al. |
| 2014/0127537 A1 | 5/2014 | Pflueger et al. |
| 2014/0154541 A1 | 6/2014 | Asakura et al. |
| 2015/0069829 A1 | 3/2015 | Dulle et al. |
| 2015/0140369 A1 | 5/2015 | Itoi et al. |

FOREIGN PATENT DOCUMENTS

| | | |
|---|---|---|
| JP | H06176748 A | 6/1994 |
| JP | H1140124 A | 2/1999 |
| JP | 2003045394 A | 2/2003 |
| JP | 2005339932 | 12/2005 |
| JP | 2006244981 A | 9/2006 |
| JP | 2007027011 A | 2/2007 |
| JP | 2009070628 A | 4/2009 |
| JP | 2010287514 A | 12/2010 |
| JP | 2011175844 A | 9/2011 |
| JP | 2012015121 A | 1/2012 |
| JP | 2014170613 | 9/2014 |
| WO | 2012028356 A1 | 3/2012 |
| WO | 2012133710 A1 | 10/2012 |
| WO | 2013018305 A1 | 2/2013 |
| WO | 2014065110 A1 | 5/2014 |

* cited by examiner

BATTERY MODULE VENT SYSTEM AND METHOD

BACKGROUND

The present disclosure relates generally to the field of batteries and battery modules. More specifically, the present disclosure relates to a vent structure for Lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems.

The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator.

Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, battery modules may be subject to releases of pressurized gases from electrochemical cells to prevent issues related to accumulated pressure in certain types of batteries. It is now recognized that improved techniques for venting gases from lithium-ion batteries may be desirable to avoid issues associated with accumulation of gases and associated pressure. For example, in certain configurations, the vented gases may be expelled near module components, which may be negatively impacted by the temperature and/or composition of the vented gases. Accordingly, it may be desirable to mitigate such negative impacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module including a housing having an interior defined by multiple sides, one side of which is a lid. The battery module also includes lithium ion electrochemical cells disposed in the housing, each cell having a vent through which gases may be vented. Moreover, the battery module includes a first chamber defined by interior aspects of the housing. Furthermore, the first chamber receives vented gases directed in a first direction from the electrochemical cells. In addition, the battery module includes a surface of the first chamber. The surface is configured to direct the vented gases in a second direction. The battery module also includes a second chamber defined partially by the lid. The second chamber receives the vented gases from the first chamber and directs the vented gases from the housing.

The present disclosure also relates to a battery module including electrochemical cells disposed within a housing. In certain embodiments, the electrochemical cells are arranged such that a vented gas released from the electrochemical cells is directed in a first direction via cell vents. The battery module also includes a panel coupled to a first side of the housing. The panel is arranged adjacent to the electrochemical cells. Also, the battery module includes a lid coupled to a second side of the housing and a vent structure configured to direct the vented gases out of the battery module. In certain embodiments, the vent structure includes a first chamber defined by the panel and the first side of the housing. The first chamber is adjacent to the electrochemical cells and configured to receive the vented gases from the cell vents. Moreover, the vent structure includes a surface positioned within the first chamber along an immediate flow path of the vented gases. The immediate flow path is substantially in the first direction. Also, the vent structure includes a second chamber defined by the second side of the housing and the lid. In certain embodiments, the second chamber is fluidly coupled to the first chamber and configured to receive the vented gases from the first chamber in a second direction, the second direction being different than the first direction.

The present disclosure further relates to a battery module including a lithium-ion electrochemical cell disposed within a housing. The lithium-ion electrochemical cell is configured to release vented gases via a cell vent. The battery module also includes a panel coupled to the housing. In certain embodiments, the panel and the housing cooperate to enclose the lithium-ion electrochemical cell. Also, the battery module includes a vent structure formed within the battery module and configured to direct the vented gases out of the battery module. The vent structure includes a first chamber defined by the panel, the electrochemical cell, and the housing. In certain embodiments, the first chamber is configured to receive the vented gases from the cell vent and to direct the vented gases away from the lithium-ion electrochemical cell. Moreover, the vent structure includes a second chamber defined by the housing and a lid coupled to the housing. The second chamber is configured to receive the vented gases from the first chamber and to direct the vented gases out of the battery module. Also, the vent structure includes a portal positioned between the first chamber and the second chamber. The portal fluidly couples the first chamber to the second chamber.

The present disclosure further relates to a battery module including a housing having multiple sides, one side of which is a lid. Also, the battery modules includes a plurality of electrochemical cells disposed in the housing in a stacked orientation in which the plurality of electrochemical cells are oriented to vent gases from respective cell vents in a first direction. Furthermore, the lid forms part of a fluid passageway in which the gases from the respective cells vents in a second direction, the fluid passageway being at least partially formed by a baffle that extends from the lid.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufactures that generally produce traditional gas-powered vehicles may desire to utilize improved vehicle technologies (e.g., regenerative braking technology) within their vehicle lines. Often, these manufactures may utilize one of their traditional vehicle platforms as a starting point. Accordingly, since traditional gas-powered vehicles are designed to utilize 12 volt battery systems, a 12 volt lithium ion battery may be used to supplement a 12 volt lead-acid battery. More specifically, the 12 volt lithium ion battery may be used to more efficiently capture electrical energy generated during regenerative braking and subsequently supply electrical energy to power the vehicle's electrical system. Additionally, in a mHEV, the internal combustion engine may be disabled when the vehicle is idle. Accordingly, the 12 volt lithium ion battery may be used to crank (e.g., restart) the internal combustion engine when propulsion is desired.

However, as advancements are made in vehicle technologies, high voltage electrical devices may be included in the vehicle's electrical system. For example, the lithium ion battery may supply electrical energy to an electric motor in a FHEV. Often, these high voltage electrical devices utilize voltages greater than 12 volts, for example, up to 48, 96, or 130 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

Thus, the design choice regarding whether to utilize a 12 volt lithium ion battery or a 48 volt lithium ion battery may depend directly on the electrical devices included in a particular vehicle. Although the voltage characteristics may differ, the operational principles of a 12 volt lithium ion battery and a 48 volt lithium ion battery are generally similar. More specifically, as described above, both may be used to capture electrical energy during regenerative braking and subsequently supply electrical power to electrical devices in the vehicle. Additionally, as both operate over a period of time, the operational parameters may change. For example, the temperature of the lithium ion battery may increase the longer the lithium ion battery is in operation.

Accordingly, to simplify the following discussion, the present techniques will be described in relation to a battery system with a 12 volt lithium ion battery and a 12 volt lead-acid battery. However, one of ordinary skill in art should be able to adapt the present techniques to other battery systems, such as a battery system with a 48 volt lithium ion battery and a 12 volt lead-acid battery.

Battery modules, in accordance with the present disclosure may be configured to release pressurized gases into the housing of the battery module. For example, the electrochemical cells may be susceptible to increases in heat, during normal and/or abnormal operation, causing an increase in internal pressure. Vents may be integrated into the electrochemical cells to enable the release of the pressurized gases. However, because the battery modules often include temperature sensitive components (e.g., electronics, sensors), the pressurized gas is directed out of the battery module to a desired venting location.

Accordingly, the battery module housing may include a vent structure configured to direct pressurized gases away from the electrochemical cells and other temperature sensitive components along a particular path. For example, a vent chamber may be aligned with the vents to collect and receive the vented gases. Moreover, the vent chamber may be fluidly connected to an internal portal to direct the gases through a guiding chamber for expulsion out of the battery module. In certain embodiments, the vent chamber includes recesses configured to receive plates. For example, the plates may be configured to redirect the flow of pressurized gases toward the internal portal. Moreover, the vent structure may be configured to couple to the lid of the battery module to further direct flow of the pressurized gases out of the battery module.

Figure 1:
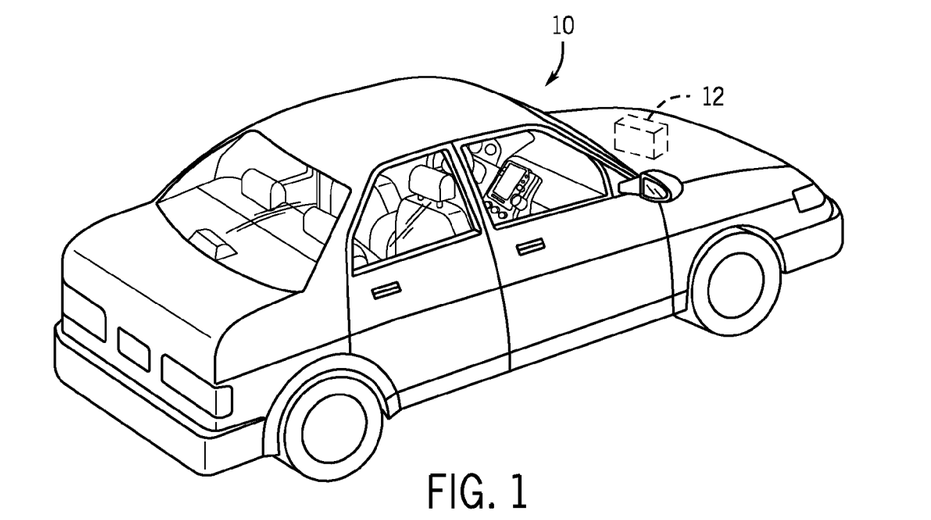
FIG. 1 is a perspective view of a vehicle having a battery module configured in accordance with present embodiments to provide power for various components of the vehicle.

With the foregoing in mind, present embodiments relate to retention structures and associated components applied to any battery or battery system, in particular battery systems employed in an xEV. For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
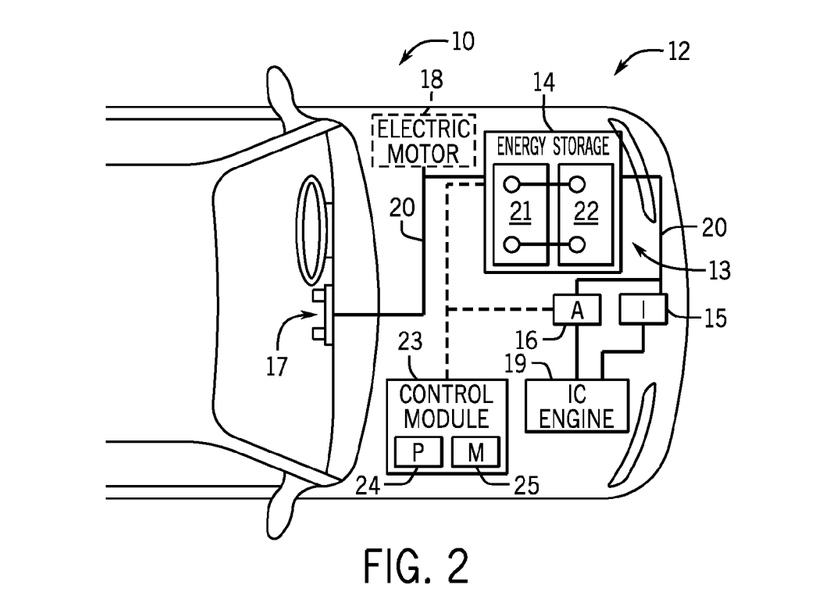
FIG. 2 is a schematic view of the vehicle depicted in FIG. 1 a battery system in the vehicle, in accordance with an embodiment of the present approach.

A more detailed view of the battery system 12 is described in FIG. 2. As depicted, the battery system 12 includes an energy storage component 14 coupled to an ignition system 15, an alternator 16, a vehicle console 27, and optionally to an electric motor 18. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 17 and the ignition system 15, which may be used to start (e.g., crank) the internal combustion engine 19.

Additionally, the energy storage component 14 may capture electrical energy generated by the alternator 16 and/or the electric motor 18. In some embodiments, the alternator 16 may generate electrical energy while the internal combustion engine 19 is running. More specifically, the alternator 16 may convert the mechanical energy produced by the rotation of the internal combustion engine 19 into electrical energy. Additionally or alternatively, when the vehicle 10 includes an electric motor 18, the electric motor 18 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 16 and/or the electric motor 18 during regenerative braking. As such, the alternator 16 and/or the electric motor 18 are generally referred to herein as a regenerative braking system.

To facilitate capturing and supplying electric energy, the energy storage component 14 may be electrically coupled to the vehicle's electric system via a bus 20. For example, the bus 20 may enable the energy storage component 14 to receive electrical energy generated by the alternator 16 and/or the electric motor 18. Additionally, the bus 20 may enable the energy storage component 14 to output electrical energy to the ignition system 15 and/or the vehicle console 17. Accordingly, when a 12 volt battery system 12 is used, the bus 20 may carry electrical power typically between 8-18 volts.

Additionally, as depicted, the energy storage component 14 may include multiple battery modules 13. For example, in the depicted embodiment, the energy storage component 14 includes a lithium ion (e.g., a first) battery module 21 and a lead-acid (e.g., a second) battery module 22, which each includes one or more battery cells. In other embodiments, the energy storage component 14 may include any number of battery modules 13. Additionally, although the lithium ion battery module 21 and lead-acid battery module 22 are depicted adjacent to one another, they may be positioned in different areas around the vehicle. For example, the lead-acid battery module 22 may be positioned in or about the interior of the vehicle 10 while the lithium ion battery module 21 may be positioned under the hood of the vehicle 10.

In some embodiments, the energy storage component 14 may include multiple battery modules to utilize multiple different battery chemistries. For example, when the lithium ion battery module 21 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 23. More specifically, the control module 23 may control operations of components in the battery system 12, such as relays (e.g., switches) within energy storage component 14, the alternator 16, and/or the electric motor 18. For example, the control module 23 may regulate amount of electrical energy captured/supplied by each battery module 21 or 22 (e.g., to de-rate and re-rate the battery system 12), perform load balancing between the battery modules 21 and 22, determine a state of charge of each battery module 21 or 22, determine temperature of each battery module 21 or 22, control voltage output by the alternator 16 and/or the electric motor 18, and the like.

Accordingly, the control module (e.g., unit) 23 may include one or processor 24 and one or more memory 25. More specifically, the one or more processor 24 may include one or more application specific integrated circuits (ASICs), one or more field programmable gate arrays (FPGAs), one or more general purpose processors, or any combination thereof. Additionally, the one or more memory 25 may include volatile memory, such as random access memory (RAM), and/or non-volatile memory, such as read-only memory (ROM), optical drives, hard disc drives, or solid-state drives. In some embodiments, the control unit 23 may include portions of a vehicle control unit (VCU) and/or a separate battery control module.

Furthermore, as depicted, the lithium ion battery module 21 and the lead-acid battery module 22 are connected in parallel across their terminals. In other words, the lithium ion battery module 21 and the lead-acid battery module 22 may be coupled in parallel to the vehicle's electrical system via the bus 20.

Figure 3:
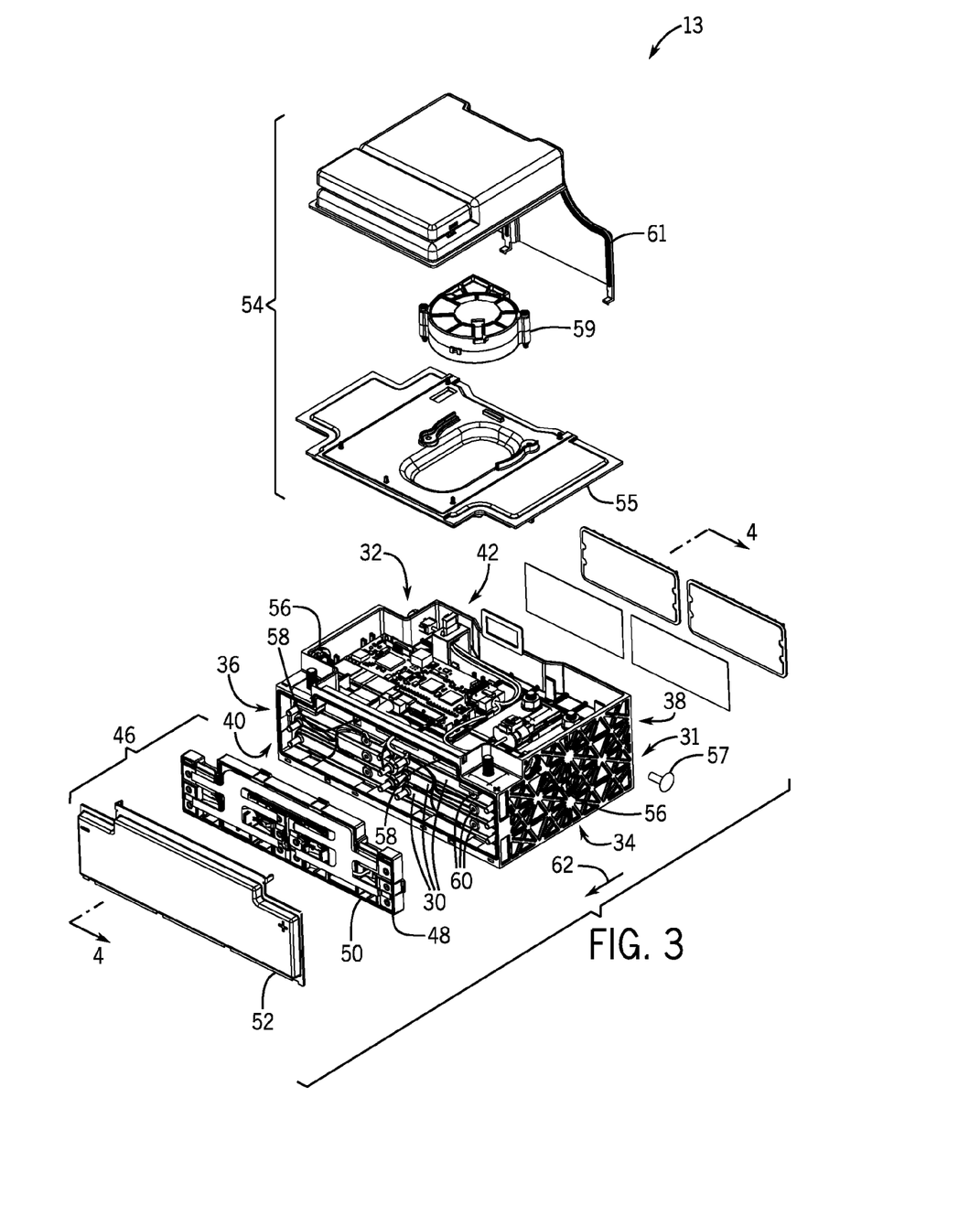
FIG. 3 is a partially exploded perspective view of an embodiment of a battery module for use in the vehicle of FIG. 1, the battery module having a vent structure configured to direct vent gases out of the battery module.

A partially exploded perspective view of the battery module 13 in accordance with the present disclosure is shown in FIG. 3. In the illustrated embodiment, the battery module 13 includes a number of individual electrochemical cells 30 (e.g., Li-ion electrochemical cells 30, battery cells, cells) housed in a housing 31 of the battery module 13. As will be described below, the housing 31 includes multiple sides defining an interior portion. For example, several sides and a lid may define a void in the housing 31, forming the interior portion. In certain embodiments, the electrochemical cells 30 are prismatic cells arranged in a stacked configuration. However, in other embodiments, the electrochemical cells 30 may be cylindrical, oblong, or the like according to the energy density and size constrains for the battery module 13. The housing 31 includes a top side 32 (e.g., top wall), a bottom side 34 (e.g., bottom wall), and two reinforcing sides 36, 38 (e.g., reinforcing walls). The housing 31 also includes a front side 40 (e.g., front wall) and a back side 42 (e.g., back wall). It should be noted that the top side 32, the bottom side 34, the two reinforcing sides 36, 38, the front side 40, and the back side 42 (or walls) may be, depending on the embodiment, disposed in any orientation with respect to the vehicle 10. The terms top, bottom, and sides may be construed as relative terms that relate, in context, to the orientation, position, or location of the various components (e.g., walls) of the battery module 13 and housing 31 thereof with respect to any other components of the battery module 31, the housing 31 thereof, and/or the vehicle 10. Indeed, presently disclosed embodiments may be applicable to any battery module 13 having the same or different configuration and/or orientation described above and in detail below. One of ordinary skill in the art would recognize that the components and examples used to describe battery modules 13 in accordance with the present disclosure should not be construed to limit the present disclosure to those components and examples alone. Rather, the disclosed examples are merely intended to serve as non-limiting examples to facilitate discussion of the present disclosure.

The front side 40 of the housing 31, in the illustrated embodiment, is covered by a panel 46. In certain embodiments, the panel 46 includes a snap on e-carrier 48, which may be utilized, for example, to establish electrical connections between the electrochemical cells 30. In the illustrated embodiment, the e-carrier 48 includes an integrated bus bar 50 configured to electrically couple the electrochemical cells 30. The front side 40 of the housing 31 may be further covered by a front cover 52, which may be coupled to the e-carrier 48 or to one or more portions or components of the housing 31 itself. Further, a lid assembly 54 may fit over the top side 32 (e.g., top wall), where certain components (e.g., vent structure components) of the battery module 31 may be disposed on top of the top side 32, between the top side 32 of the housing 31 and the lid assembly 54 of the battery module 13. In certain embodiments, the lid assembly 54 may include a housing lid 55, a fan 59, a top cover 61, or the like. Furthermore, in certain embodiments, components of the lid assembly 54 may be integrally formed. For example, the housing lid 55 may be coupled to the top cover 61. Moreover, in embodiments where the fan 59 is not included, the lid assembly 54 may include only the housing lid 55 and the top cover 61.

In accordance with the present disclosure, battery module 13 further includes external portals 56 (which may also be referred to as second portals) disposed on each reinforcing side 36, 38. While the illustrated embodiment includes two external portals 56, in other embodiments there may be 1, 3, 4, 5, 6, or any suitable number of external portals 56 on any one or combination of the sides 36, 38. As shown, the external ports 56 are generally cylindrical and may include a plug 57 configured to block flow out of the external portals 56 (e.g., up to a predetermined pressure threshold). Moreover, while the external portals 56 are shown on each reinforcing side 36, 38, it is appreciated that the location of the external portals 56 may be particularly selected to accommodate routing of an exhaust hose based on the available space within the vehicle 10. Furthermore, an internal portal 58 fluidly couples the external portals 56 to a vent chamber (not shown). In the illustrated embodiment, the internal portal 58 extends through the housing 31 to create a fluid pathway for the pressurized gases. As shown, two internal portals 58 are configured to direct pressurized gases toward the external portals 56. However, in other embodiments, more or fewer internal portals 58 may extend through the housing 31. As will be described in detail below, the vent chamber is configured to collect pressurized gases and direct the gases toward the external portals 56 via the internal portals 58.

As shown in FIG. 3, the battery module 13 includes two columns of electrochemical cells 30 having cell vents 60. The cell vents 60 are configured to expel pressurized gases (e.g., vented gases 65) accumulated within the electrochemical cells 30. For example, in certain embodiments, the internal temperature of the electrochemical cells 30 may increase, causing an accumulation of pressurized gases. To avoid an overpressure scenario, and prevent potential damage to the electrochemical cells 30, the cell vents 60 may enable the release of the pressurized gases from the electrochemical cells 30. As shown, the cell vents 60 are positioned to direct the vented gases 65 toward the panel 46 in a first direction 62.

Figure 4:
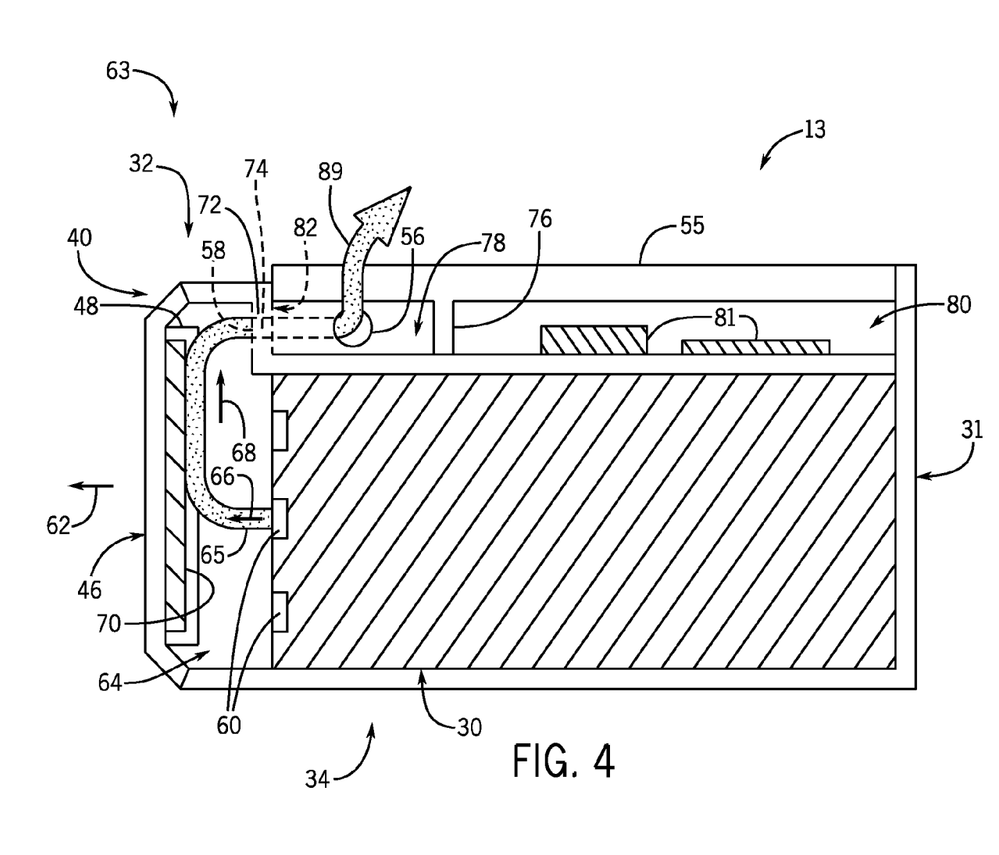
FIG. 4 is a schematic cross-sectional side view along line 4-4 of the battery module of FIG. 3, in accordance with an aspect of the present disclosure.

FIG. 4 is a schematic cross-sectional side view along line 4-4 of an embodiment of the battery module 13. As discussed above, the electrochemical cells 30 are stacked in columns with the cell vents 60 oriented to direct the vented gases 65 toward the panel 46 in the first direction 62. A vent structure 63 includes a vent chamber 64 (which may also be referred to as a first chamber) positioned proximate to the cell vents 60 at the front side 40 of the housing 31. The vent chamber 64 is defined by interior aspects of the housing 31 and is configured to receive the vented gases 65 emitted from the electrochemical cells 30. For example, the vent chamber 64 is partially formed by the side of the housing 31 (e.g., walls of the front side 40) and the panel 46 coupled to the same side of the housing 31. However, in other embodiments, the chamber 64 may be formed by any side of the housing 31. In the illustrated embodiment, the vent chamber 64 extends from the bottom side 34 of the housing 31 to the top side 32 of the housing 31. That is, the vent chamber 64 has a first length that may span substantially a height of the housing 31. However, in other embodiments, the vent chamber 64 may only extend over a portion of the housing 31. As shown, the vent chamber 64 is configured to direct an immediate flow path 66 of the vented gases 65. The cell vents 60 expel the vented gases 65 in the first direction 62 and the vent chamber 64 is configured to redirect the vented gases 65 in a second direction 68. For example, the temperature gradient of the pressurized gases may facilitate flow in the second direction 68 toward the top side 32 of the housing 31. Moreover, during a venting operation, the top side 32 may have a lower pressure than the bottom side 34 of the vent chamber 64, due to openings and available space, enabling flow toward the top side 32. In the illustrated embodiment, the second direction 68 is substantially transverse (e.g., perpendicular, crosswise) to the first direction 62. As a result, the vented gases 65 are directed away from the electrochemical cells 30 and toward the top side 32 of the housing 31.

In the illustrated embodiment, a volume of the vent chamber 64 is defined by the e-carrier 48 and the front side 40 of the housing 31. In other words, coupling the e-carrier 48 to the housing 31 forms the vent chamber 64. In certain embodiments, the e-carrier 48 includes channels or cut-outs to increase or decrease the volume of the vent chamber 64. Moreover, as will be described below, the e-carrier 48 may include slots configured to receive plates 70 (which may also be referred to as a surface feature or surface). In the illustrated embodiment, the vented gases 65 impinge on the plates 70 when the vented gases 65 are vented in the first direction 62. Accordingly, the plates 70 may be subjected to additional heat and/or pressure than other portions of the vent chamber 64. In certain embodiments, the plates 70 are metallic (e.g., metals, metal alloys, composite materials). However, in other embodiments, the plates 70 may be any material configured to withstand the temperature and pressure of the vented gases 65. Moreover, the plates 70 may insulate electronic components (e.g., bus features) disposed on the e-carrier 48 from the vented gases 65. To that end, the plates 70 enable integration of electronic components with the e-carrier 48, thereby enabling a smaller and more compact battery module 13. Furthermore, the plates 70 may absorb heat from the vented gases 65 before the gases reach the internal portal 58.

As discussed above, the vent chamber 64 is fluidly coupled to the internal portal 58. In certain embodiments, the internal portal 58 (which may also be referred to as a first portal) is formed within the housing 31 at the front side 40. For example, a lip 72 of the housing 31 may include a single hole or multiple holes 74 acting as the internal portal 58 to enable the vented gases 65 to flow toward the external portals 56. In certain embodiments, there may be one hole 74. However, in other embodiments, there may be 2, 3, 4, 5, 6, or any suitable number of holes 74. In certain embodiments, the holes 74 may be substantially aligned (e.g., vertically aligned) with the cell vents 60. Moreover, in other embodiments, the holes 74 may have particularly selected cross sections configured to modify fluid properties of the pressurized gases. For example, the cross-section of the holes 74 may decrease as the gases flow through the holes 74, thereby increasing the velocity of the vented gases 65. In other embodiments, the holes 74 may be configured to initiate a pressure drop as the gases travel through the holes.

As shown in FIG. 4, the housing lid 55 is configured to couple to the housing 31 to cover and protect various electronics of the battery module 13. The housing lid 55 includes a baffle 76 configured to contact the housing 31, thereby establishing at least two compartments on the top side 32 of the housing 31. In the illustrated embodiment, the baffle 76 extends toward the interior of the housing 31. One of the compartments may be a guidance chamber 78 (which may also be referred to as a second chamber) formed proximate to the internal portal 58 and fluidly coupled to both the internal portal 58 and the external portal 56. In the illustrated embodiment, the guidance chamber 78 is defined at least partially by the housing lid 55 and the housing 31. The guidance chamber 78 has a length described as a distance from the front side 40 to the back side 42. For example, the length of the guidance chamber 78 may extend over only a portion of the top side 32 of the battery module 13. The guidance chamber 78 directs the vented gases 65 toward the external portal 58 and out of the housing 31. A second of the compartments, an isolation chamber 80 (which may also be referred to as a third chamber), may be separated from the guidance chamber 78 by the baffle 76. As shown, the isolation chamber 80 is partially defined by the baffle 76 and the housing lid 55. Furthermore, the isolation chamber 80 is adjacent to the guidance chamber 78, and the isolation and guidance chambers 80, 78 are separated by the baffle 76. In other words, the baffle 76 substantially seals the isolation chamber 80 from the vent chamber 64 and the guidance chamber 78. In certain embodiments, electronic components 81 (e.g., temperature sensitive components) are disposed within the isolation chamber 80 to facilitate control and/or operation of the battery module 13. For example, the isolation chamber 80 may house a printed circuit board, sensors, switches (e.g., relays), and the like. In certain embodiments, the baffle 76 bears flush against a surface of the housing 31. However, in other embodiments, the housing 31 includes a recess configured to receive the baffle 76. It will be appreciated that the baffle 76 may be configured to create a tortuous flow path for the pressurized exhaust gases, thereby decreasing the pressure of the vented gases 65 before expulsion through the external ports 56. Accordingly, the vent structure 63 may be configured to direct the vented gases 65 away from a first region of the housing 31 that houses the electrochemical cells 30 and into a second region coupled to the first region by the internal portal 58.

In certain embodiments, the vent structure 63 includes regulation components 82 (which may be referred to as a regulator) configured to control the flow of the vented gases 65 through the vent structure 63. For example, a rupture disc may be positioned between the vent chamber 64 and the internal portal 58. As a result, the vent chamber 64 may be configured to receive and store the vented gases 65 until a threshold pressure is reached, thereby activating the rupture disc and enabling flow toward the external portals 56. Furthermore, in certain embodiments, the rupture discs may be positioned at the external portals 56. In other embodiments, a tortuous flow path may be positioned within the vent chamber 64 to decrease the pressure of the vented gases 65 before reaching the internal portal 58. Moreover, in certain embodiments, the regulation components 82 include check valves.

Present embodiments disclose the vent structure 63 configured to direct a flow path 89 of the vented gases 65 away from the electrochemical cells 30 and out of the battery module 13 and/or housing 31. For example, the vented gases 65 may exit the electrochemical cells 30 in the first direction 62 (e.g., substantially aligned with the orientation of the cell vents 60 of the electrochemical cells 30). The immediate flow path 66 of the vented gases 65 may contact the plates 70. The plates 70 define a portion of the interior aspects of the vent chamber 64. In certain embodiments, the vented gases 65 may disperse off of the plates 70 in multiple directions while generally being directed along a path. For example, a portion of the vented gases 65 may move toward the bottom side 34 of the housing 31 while another portion of the vented gases 65 moves toward the top side 32 of the housing 31. Furthermore, the vented gases 65 may build up toward the bottom side 34 of the vent chamber 64. However, as described above, the pressure and/or temperature gradient of the vent chamber 64 may encourage the vented gases 65 to move along the flow path 89 in the second direction 68. As mentioned above, the second direction 68 is generally transverse or crosswise relative to the first direction 62, but includes some general dispersion as would be understood by one of ordinary skill in the art. Accordingly, the flow path 89 may continue redirect the vented gases 65 in multiple different directions toward and/or through the internal portals 58 to the guidance chamber 78. Furthermore, the baffle 76 may direct the vented gases 65 out of the guidance chamber 78 toward the external portal 56, thereby venting the vented gases 65 from the battery module 13.

Figure 5:
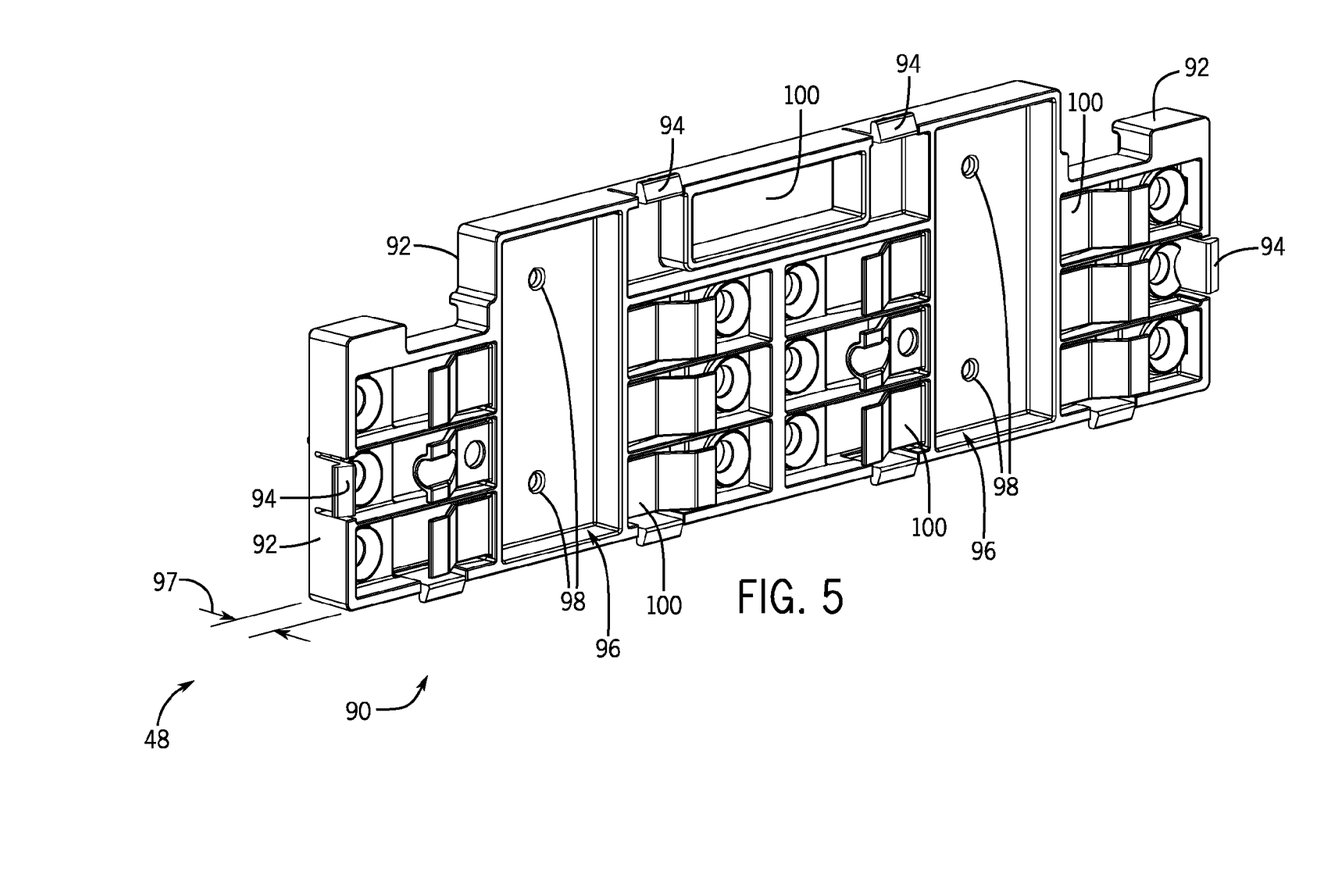
FIG. 5 is a perspective view of an embodiment of an e-carrier of the battery module of FIG. 3, the e-carrier forming a portion of the vent structure, in accordance with an aspect of the present disclosure.

FIG. 5 is a perspective view of an embodiment of a back portion 90 of the e-carrier 48. As mentioned above, the e-carrier 48 is configured to couple to the housing 31 at the front side 40, thereby forming the vent chamber 64. The back portion 90 includes walls 92 that align with the housing 31. As mentioned above, in certain embodiments, the e-carrier 48 snaps on to the housing 31 via clips 94. For example, the housing 31 may include mating attachments to receive the clips 94 and secure the e-carrier 48 to the housing 31.

In the illustrated embodiment, the e-carrier 48 also includes slots 96 configured to receive the plates 70. For example, the slots 96 may be generally rectangular openings that receive the plates 70. However, in other embodiments, the plates 70 may be coupled to the e-carrier 48 via openings 98. For example, screws, rivets, or the like may couple the plates 70 to the e-carrier 48. As mentioned above, the slots 96 are generally aligned with the cell vents 60. As a result of this alignment, the immediate flow path 66 is configured to impinge against the slots 96 (or plates 70) while the battery module 13 is fully assembled.

As discussed above, the volume of the vent chamber 64 may be particularly selected based on the number of electrochemical cells 30, the size of the battery module 13, the chemistry of the electrochemical cells 30, and the like. Accordingly, a length 97 of the walls 92 may be adjusted to modify the volume of the vent chamber 64. Moreover, in certain embodiments, projections 100 may extend into the vent chamber 64 from the e-carrier 48 to apply a pressure against the electrochemical cells 30 to hold the electrochemical cells 30 within the housing 31. However, in certain embodiments, a configuration of the projections 100 selectively reduces the volume of the vent chamber 64. Furthermore, the projections 100 may also form grooves, pathways, or a tortuous flow path to guide the pressurized gas toward the internal portal 58. As a result, the pressure and/or temperature of the pressurized gas may be reduced when the vented gases 65 reach the internal portal 58.

Figure 6:
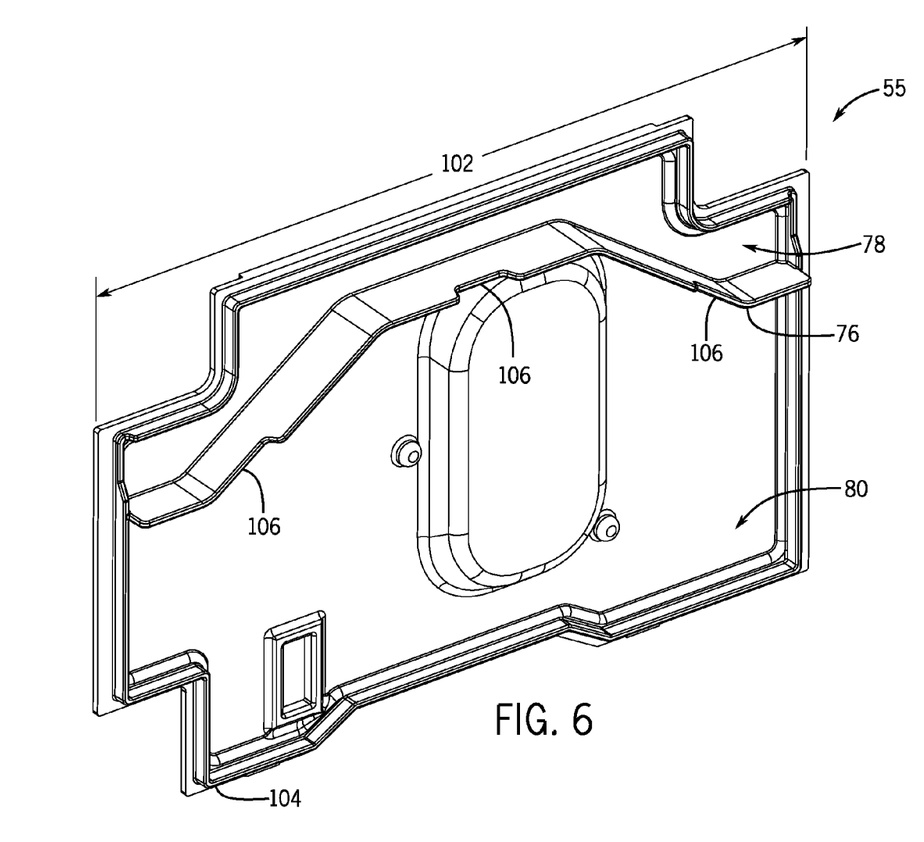
FIG. 6 is a perspective view of a top cover of the battery module of FIG. 3, the top cover having a baffle that forms a guidance chamber of the vent structure, in accordance with an aspect of the present disclosure.

FIG. 6 is a perspective view of an embodiment of the housing lid 55. As described above, the housing lid 55 is configured to couple to the housing 31, thereby enclosing the electronic components 81 within the housing. The housing lid 55 includes the baffle 76 extending across a width 102 of the housing lid 55. As described below, the baffle 76 is configured to extend toward the interior of the housing 31 and to divide the housing 31 into the guidance chamber 78 and an isolation chamber 80. The position of the baffle 76 is particularly selected based on the size and shape of the electronic components 81 and the configuration of the electrochemical cells 30. For example, in embodiments that include several electrochemical cells 30, the guidance chamber 78 may be larger to accommodate a greater volume of pressurized gases. Furthermore, in embodiments with several electronic components 81, the isolation chamber 80 may be larger to enable a desired configuration of the electronic components 81. For example, in the illustrated embodiment, the guidance chamber 78 is smaller than the isolation chamber 80. However, in other embodiments, the guidance chamber 78 may be the same size as the isolation chamber 80 or larger than the isolation chamber 80.

In the illustrated embodiment, the housing lid 55 includes a ridge 104 about a perimeter of the housing lid 55. In certain embodiments, the ridge 104 is configured to couple to a lip of the housing 31 to secure the housing lid 55 to the housing 31. Furthermore, the ridge 104 may provide an indication to the operator regarding the proper installation orientation of the housing lid 55. For example, the housing lid 55 may be configured to not couple to the housing 31 in an improper orientation because of interference between the ridge 104 and the housing 31. In certain embodiments, the housing 31 may include features configured to receive and lock the ridge 104 to the housing 31.

As shown, the baffle 76 includes cut outs 106 at different locations across the width 102 of the housing lid 55. In certain embodiments, the cut outs 106 are configured to align with extensions on the housing 31, thereby assisting an operator in positioning the housing lid 55 on the housing 31. Moreover, in certain embodiments, the cut outs 106 are configured to lock the housing lid 55 to the housing 31. For example, the housing 31 may include clips that receive the cut outs 106 and secure the housing lid 55 to the housing 31. As a result, the housing lid 55 couples to the housing 31 and isolates the guidance chamber 78 from the isolation chamber 80. In certain embodiments, the baffle 76 includes a seal configured to bear against the housing 31 while the housing lid 55 is installed. As mentioned above, the housing 31 may receive electronic components 81 to facilitate operation of the battery system 12. However, in certain embodiments, the electronics may be sensitive to the heat of the vented gases. Accordingly, the baffle 76 forms a partition between the vented gases 65 and the electronic components 81, enabling a more compact battery module 13 because the guidance chamber 78 and isolation chamber 80 may be positioned adjacent to one another.

Figure 7:
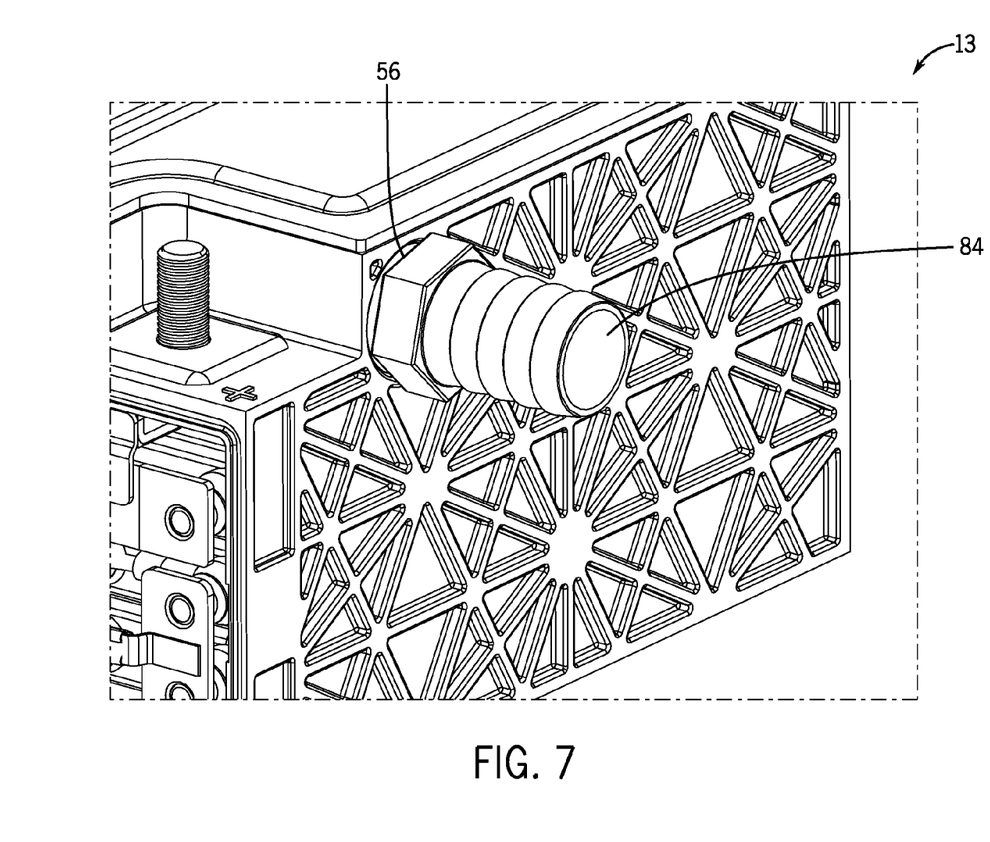
FIG. 7 is a perspective view of an exhaust adapter of the battery module of FIG. 3, in accordance with an aspect of the present disclosure.

FIG. 7 is a perspective view of an embodiment of the battery module 13 having a hose adapter 84 coupled to the external portal 56. In the illustrated embodiment, the hose adapter 84 is a hose bar adapter configured to couple an exhaust hose to the external portal 56. For example, the exhaust hose may be clamped to the hose adapter 84 to form a fluid pathway for the vented gases 65 to exit the battery module 13. In certain embodiments, as mentioned above, the regulation components 82 may be disposed within the external portal 56 to regulate the vented gases 65 flowing through the hose adapter 84.

Figure 8:
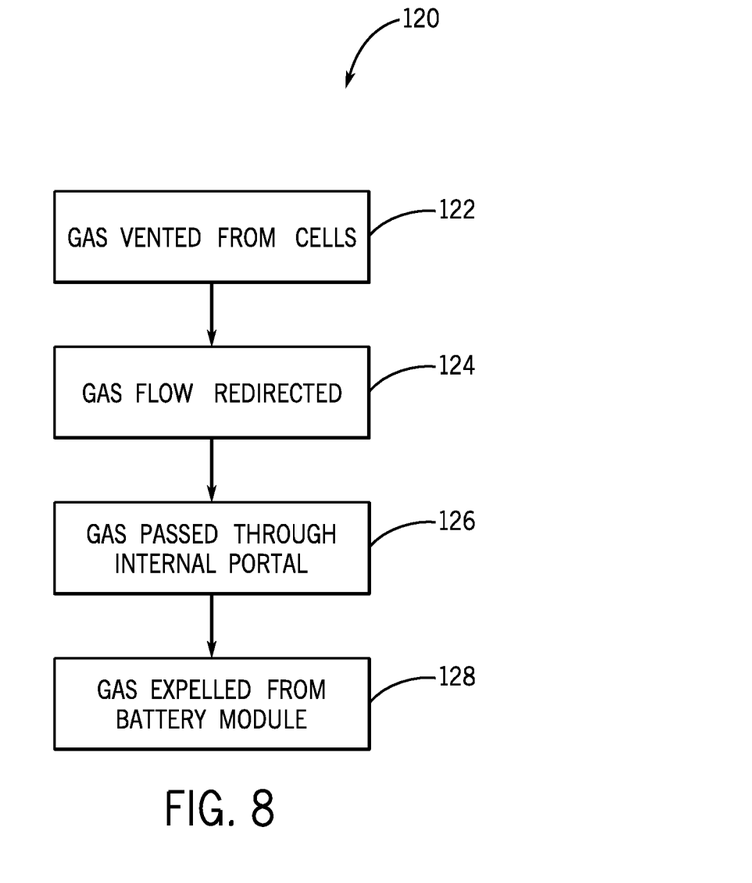
FIG. 8 is a flowchart of an embodiment of a method for venting pressurized gases from the battery module of FIG. 3, in accordance with an aspect of the present disclosure.

FIG. 8 is an embodiment of a method 120 for venting pressurized gas from the electrochemical cells 30. The vented gases 65 are released from the electrochemical cells 30 at block 122. For example, the vented gases 65 are released from the cell vents 60 in the first direction 62 (FIG. 3). The vented gases 65 are redirected in the second direction 68 at block 124. For example, in the illustrated embodiment of FIG. 4, the vented gases 65 impinge on the plates 70 when the vented gases 65 are vented in the first direction 62. The plates 70 and the vent chamber 64 are configured to redirect the vented gases 65 toward the top side 32 of the housing 31 in the second direction 68. The gas passes through the internal portal 58 (FIG. 4) at block 126. The internal portal 58 is configured to fluidly connect the vent chamber 64 with the external portals 56. In the illustrated embodiment of FIG. 4, the internal portal 58 is integrally formed with the housing 31. For example, the internal portals 58 direct the vented gases 65 toward the guidance chamber 78. The gas is expelled from the battery module 13 via the external portals 56 at block 128. There, the baffle 76 may direct the vented gases 65 toward the external portals 56, for final expulsion from the battery module 13.

Figure 9:
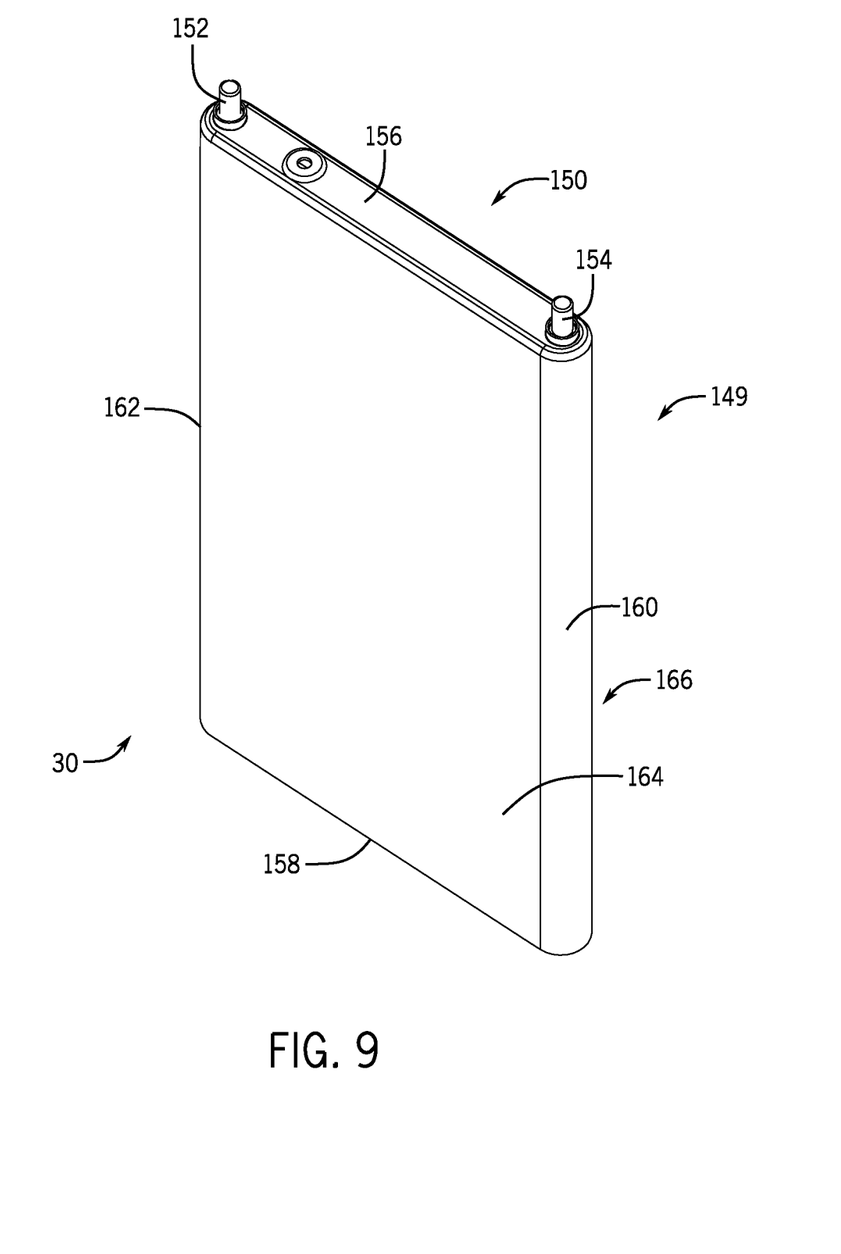
FIG. 9 is a perspective view of a prismatic battery cell used in the lithium ion battery, in accordance with an embodiment of the present approach.

The battery cells 30 described herein may be prismatic battery cells, where a prismatic battery cell, as defined herein, includes a prismatic case 149 that is generally rectangular in shape, as shown in FIG. 9. In contrast to pouch cells, the prismatic casing is formed from a relatively inflexible, hard (e.g., metallic) material. However, it should be noted that certain of the embodiments described below may incorporate pouch cells in addition to or in lieu of prismatic battery cells. In accordance with present embodiments, each prismatic battery cell may include a top casing portion 150, where a set of cell terminals 152, 154 (e.g., positive and negative cell terminals) are located. One or more cell vents 156 may also be located on the top casing portion 150. The prismatic cell casing 149 also includes a bottom casing portion 158 positioned opposite the top casing portion 150. First and second sides 160, 162, which may be straight or rounded, extend between the bottom and top casing portions 150, 158 in respective positions corresponding to the cell terminals 152, 154. First and second faces 164, 166, which may be flat (as shown) or rounded, couple the first and second sides 160, 162 at opposing ends of each cell 30.

One or more of the disclosed embodiments, alone or in combination, may provide one or more technical effects useful in the production, installation, and use of battery modules for multiple applications. For example, certain embodiments of the present approach may enable a reduced overall size of the battery modules, such as by enabling the positioning electronic components proximate to ventilation chambers for pressurized gases. In addition, certain embodiments of the present approach isolate certain areas of the battery module from each other, thereby enabling a compact configuration of various components. Further, present embodiments facilitate positioning battery cells in desired orientations while redirecting vented gases to an area away from an initial vent direction. The technical effects and technical problems in the specification are examples are not limiting. It should be noted that the embodiments described in the specification may have other technical effects and can solve other technical problems.

While only certain features and embodiments in accordance with the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module comprising:
   a housing having an interior defined by multiple sides, one side of which is a lid, wherein the lid has a baffle that extends toward the interior of the housing;
   lithium ion electrochemical cells disposed in the housing, each cell having a vent through which gases may be vented;
   a first chamber defined by interior aspects of the housing, wherein the first chamber receives vented gases directed in a first direction from the electrochemical cells;
   a surface of the first chamber, wherein the surface is configured to redirect a flow of the vented gases in a second direction, the second direction being oriented transverse relative to the first direction and oriented transverse relative to an expulsion direction of the vented gases along which the vented gases are expelled from the housing;

a second chamber defined partially by the lid, wherein the second chamber receives the vented gases from the first chamber and directs the vented gases from the housing along the expulsion direction; and a third chamber partially defined by the baffle and the lid, wherein the third chamber is positioned adjacent to the second chamber, separated from the second chamber by the baffle, and substantially sealed away from the first and second chambers.

2. The battery module of claim 1 wherein the surface comprises a plate disposed within the first chamber.

3. The battery module of claim 1 wherein the surface comprises a wall defining a portion of the interior aspects of the first chamber.

4. The battery module of claim 1 wherein the first chamber is partially formed by one of the sides of the housing of the battery module and a panel coupled to the housing at the same side.

5. The battery module of claim 4 wherein the electrochemical cells are arranged in a stack and the vents of the electrochemical cells are oriented to vent gas toward the first direction.

6. The battery module of claim 1 comprising a first portal fluidly coupling the first chamber to the second chamber, wherein the first portal extends through an interior wall of the housing.

7. The battery module of claim 6 comprising a second portal configured to direct the vented gases out of the battery module from the second chamber, wherein the second portal extends through an outer wall of the housing.

8. The battery module of claim 7 wherein the second chamber is configured to direct the vented gases toward the second portal.

9. The battery module of claim 1 wherein a length of the first chamber is substantially perpendicular to a length of the second chamber.

10. The battery module of claim 1 comprising a regulator disposed between the first chamber and the second chamber, wherein the regulator comprises a rupture disc, a check valve, a tortuous flow path, or a combination thereof.

11. The battery module of claim 1 wherein the surface is comprised of a metal, a metal alloy, a composite material, or a combination thereof.

12. The battery module of claim 1 wherein the surface is arranged substantially transverse to the first direction such that the vented gases impinge on the surface when the vented gases are vented in the first direction.

* * * * *

UNITED STATES PATENT AND TRADEMARK OFFICE
CERTIFICATE OF CORRECTION

PATENT NO.       : 9,614,210 B2                                         Page 1 of 2
APPLICATION NO.  : 14/501777
DATED            : April 4, 2017
INVENTOR(S)      : Richard M. DeKeuster et al.

It is certified that error appears in the above-identified patent and that said Letters Patent is hereby corrected as shown below:

On the Title Page

1. On Page 2, in item (56), under "U.S. PATENT DOCUMENTS", in Column 1, Line 17, delete "Itoi" and insert -- Itoi et al. --, therefor.

2. On Page 2, in item (56), under "U.S. PATENT DOCUMENTS", in Column 2, Line 1, delete "Adachi" and insert -- Adachi et al. --, therefor.

In the Specification

3. In Column 1, Line 33, delete "systems" and insert -- electric vehicles --, therefor.

4. In Column 1, Line 37, delete "systems" and insert -- electric vehicles --, therefor.

5. In Column 1, Line 42, delete "acceleration" and insert -- acceleration, --, therefor.

6. In Column 3, Line 40, delete "DRAWINGS" and insert -- BRIEF DESCRIPTION OF THE DRAWINGS --, therefor.

7. In Column 3, Line 51, delete "1 a" and insert -- 1 having a --, therefor.

8. In Column 7, Lines 17-18, delete "higher maximum" and insert -- higher --, therefor.

9. In Column 8, Line 15, delete "battery module 31" and insert -- battery module 13 --, therefor.

10. In Column 8, Line 39, delete "battery module 31" and insert -- battery module 13 --, therefor.

11. In Column 10, Line 54, delete "external portal 58" and insert -- external portal 56 --, therefor.

Signed and Sealed this
Seventeenth Day of October, 2017

Joseph Matal
*Performing the Functions and Duties of the
Under Secretary of Commerce for Intellectual Property and
Director of the United States Patent and Trademark Office*

12. In Column 14, Lines 2-3, delete "bottom and top casing portions 150, 158" and insert -- bottom and top casing portions 158, 150 --, therefor.